(12) United States Patent
Dorrendorf et al.

(10) Patent No.: US 8,997,221 B2
(45) Date of Patent: Mar. 31, 2015

(54) SYSTEM AND METHOD FOR VALIDATING AND CONTROLLING APPLICATIONS

(75) Inventors: Leonid Dorrendorf, Maale Adumim (IL); Pavel Berengoltz, Petah-Tikva (IL)

(73) Assignee: Safend Ltd., Tel Aviv (IL)

( * ) Notice: Subject to any disclaimer, the term of this patent is extended or adjusted under 35 U.S.C. 154(b) by 226 days.

(21) Appl. No.: 13/122,908

(22) PCT Filed: Oct. 11, 2009

(86) PCT No.: PCT/IL2009/000970
§ 371 (c)(1),
(2), (4) Date: Apr. 6, 2011

(87) PCT Pub. No.: WO2010/041258
PCT Pub. Date: Apr. 15, 2010

(65) Prior Publication Data
US 2011/0197276 A1    Aug. 11, 2011

Related U.S. Application Data

(60) Provisional application No. 61/104,383, filed on Oct. 10, 2008.

(51) Int. Cl.
*G06F 21/00* (2013.01)
*G06F 21/54* (2013.01)
*G06F 9/445* (2006.01)

(52) U.S. Cl.
CPC ............ *G06F 21/54* (2013.01); *G06F 9/44589* (2013.01)
USPC .............................. 726/22; 713/131; 713/176

(58) Field of Classification Search
CPC .......... G06F 17/2247; G06F 17/30011; G06F 3/1238; G06F 5/015; H04L 63/08
USPC .......................................................... 726/22
See application file for complete search history.

(56) References Cited

U.S. PATENT DOCUMENTS

| | | | |
|---|---|---|---|
| 6,098,054 A | 8/2000 | McCollom et al. | |
| 6,301,699 B1 | 10/2001 | Hollander et al. | |
| 6,385,741 B1 * | 5/2002 | Nakamura | 714/38.1 |
| 8,286,239 B1 * | 10/2012 | Sutton | 726/22 |
| 8,499,355 B1 * | 7/2013 | Goncharov | 726/25 |

(Continued)

OTHER PUBLICATIONS

International Search Report of Application No. PCT/IL09/00970 mailed on Jan. 29, 2010.

(Continued)

*Primary Examiner* — Yonas Bayou
(74) *Attorney, Agent, or Firm* — Pearl Cohen Zedek Latzer Baratz LLP

(57) ABSTRACT

A system and method for validating an application and for controlling execution of an application. A plurality of parameters may be computed for an authenticated object and for a tested object. A plurality of comparison and other metrics may be computed based on the computed plurality of parameters. Control of an execution of programs may be based on said metrics. Other embodiments are described and claimed.

13 Claims, 3 Drawing Sheets

(56) References Cited

U.S. PATENT DOCUMENTS

| | | | |
|---|---|---|---|
| 2005/0149734 A1* | 7/2005 | Eronen et al. | 713/176 |
| 2006/0031790 A1 | 2/2006 | Proudler et al. | |
| 2006/0129994 A1* | 6/2006 | Srivastava et al. | 717/124 |
| 2007/0124353 A1* | 5/2007 | Cockcroft et al. | 708/200 |
| 2007/0220349 A1* | 9/2007 | Zhu et al. | 714/38 |
| 2007/0266165 A1 | 11/2007 | Li | |
| 2008/0010539 A1* | 1/2008 | Roth | 714/38 |
| 2008/0046791 A1* | 2/2008 | Bicheno et al. | 714/742 |
| 2008/0086660 A1* | 4/2008 | Wefers | 714/37 |
| 2009/0007078 A1* | 1/2009 | Hoyek et al. | 717/131 |
| 2009/0199160 A1* | 8/2009 | Vaitheeswaran et al. | 717/124 |

OTHER PUBLICATIONS

Supplementary European Search Report for Application No. EP 09 81 8879 date of completion of the search Dec. 18, 2012.

* cited by examiner

SYSTEM AND METHOD FOR VALIDATING AND CONTROLLING APPLICATIONS

CROSS-REFERENCE TO RELATED APPLICATIONS

This application is a National Phase Application of PCT International Application No. PCT/IL2009/000970, International Filing Date Oct. 11, 2009, entitled "SYSTEM AND METHOD FOR VALIDATING AND CONTROLLING APPLICATIONS", published on Apr. 15, 2010 as International Publication Number WO 2010/041258 claiming priority of U.S. Provisional Pat. App. No. 61/104,383 filed Oct. 10, 2008, both of which are incorporated herein by reference in their entirety.

BACKGROUND OF THE INVENTION

Application recognition, validation and control deals with validating, monitoring, restricting or otherwise controlling the set of programs or applications a computer may execute. Typical clients of application control technologies are corporations who wish to prevent security risks, improper use, and resource contention that may result from employees installing non-work-related or malicious applications.

An application control system or product typically provides capabilities to validate and/or identify applications and to further execute decisions based on such validation or recognition. For example, such systems may enable a user to black-list a set of predefined applications, namely, to disable a set of predefined applications from executing, or to associate a computing device with a white-list, namely, disable all but a predefined set of applications from executing on a computing device. Other utilizations of application validation and control may be forcing access restrictions, for example, by only allowing a predefined set of applications to access a specific information object or device.

Implementing an application control system may be complicated by various technical and/or other issues such as potential malicious activities. For example, validating a specific application may be complicated by an existence or coexistence of multiple application versions, frequent changes applied to applications and programs by automatic and/or manual software updates, patches, hot-fixes and the like. An application validation and control system may be required to identify tampering attempts, where an adversary may make small changes to an application with a specific intention to avoid recognition, such tampering may be hard to detect without employing various sophisticated means.

Some existing methods of application validation and control use a direct comparison of cryptographic hashes of an executable binary. Other implementations use signature recognition, where a short substring of an executable binary is chosen as a "signature" for comparison with other applications. These methods have the disadvantage of being easily overcome by intentional changes, and require significant effort to maintain associated signature and hash databases.

There is a need for a system and method to enable efficient and cost effective application validation and control.

SUMMARY OF EMBODIMENTS OF THE INVENTION

Embodiments of the invention generally relate to applications validation and execution control. Embodiments of the invention may compute a plurality of parameters for a pre-validated or otherwise known or verified application or object. A respective plurality of parameters may be computed for a tested object. Embodiments of the invention may compute a plurality of metrics by relating said computed parameters. Embodiments of the invention may further control an execution or other aspects of programs according to computed metrics.

BRIEF DESCRIPTION OF THE DRAWINGS

Embodiments of the invention are illustrated by way of example and not limitation in the figures of the accompanying drawings, in which like reference numerals indicate corresponding, analogous or similar elements, and in which.

It will be appreciated that for simplicity and clarity of illustration, elements shown in the figures have not necessarily been drawn to scale. For example, the dimensions of some of the elements may be exaggerated relative to other elements for clarity.

DETAILED DESCRIPTION OF EMBODIMENTS OF THE INVENTION

In the following detailed description, numerous specific details are set forth in order to provide a thorough understanding of the invention. However, it will be understood by those of ordinary skill in the art that the invention may be practiced without these specific details.

In other instances, well-known methods, procedures, components, modules, units and/or circuits have not been described in detail so as not to obscure the invention.

Although embodiments of the invention are not limited in this regard, discussions utilizing terms such as, for example, "processing," "computing," "calculating," "determining," "establishing", "analyzing", "checking", or the like, may refer to operation(s) and/or process(es) of a computer, a computing platform, a computing system, or other electronic computing device, that manipulate and/or transform data represented as physical (e.g., electronic) quantities within the computer's registers and/or memories into other data similarly represented as physical quantities within the computer's registers and/or memories or other information storage medium that may store instructions to perform operations and/or processes.

Although embodiments of the invention are not limited in this regard, the terms "plurality" and "a plurality" as used herein may include, for example, "multiple" or "two or more". The terms "plurality" or "a plurality" may be used throughout the specification to describe two or more components, devices, elements, units, parameters, or the like. For example, "a plurality of stations" may include two or more stations.

Unless explicitly stated, the method embodiments described herein are not constrained to a particular order or sequence. Additionally, some of the described method embodiments or elements thereof can occur or be performed at the same point in time.

Figure 1:
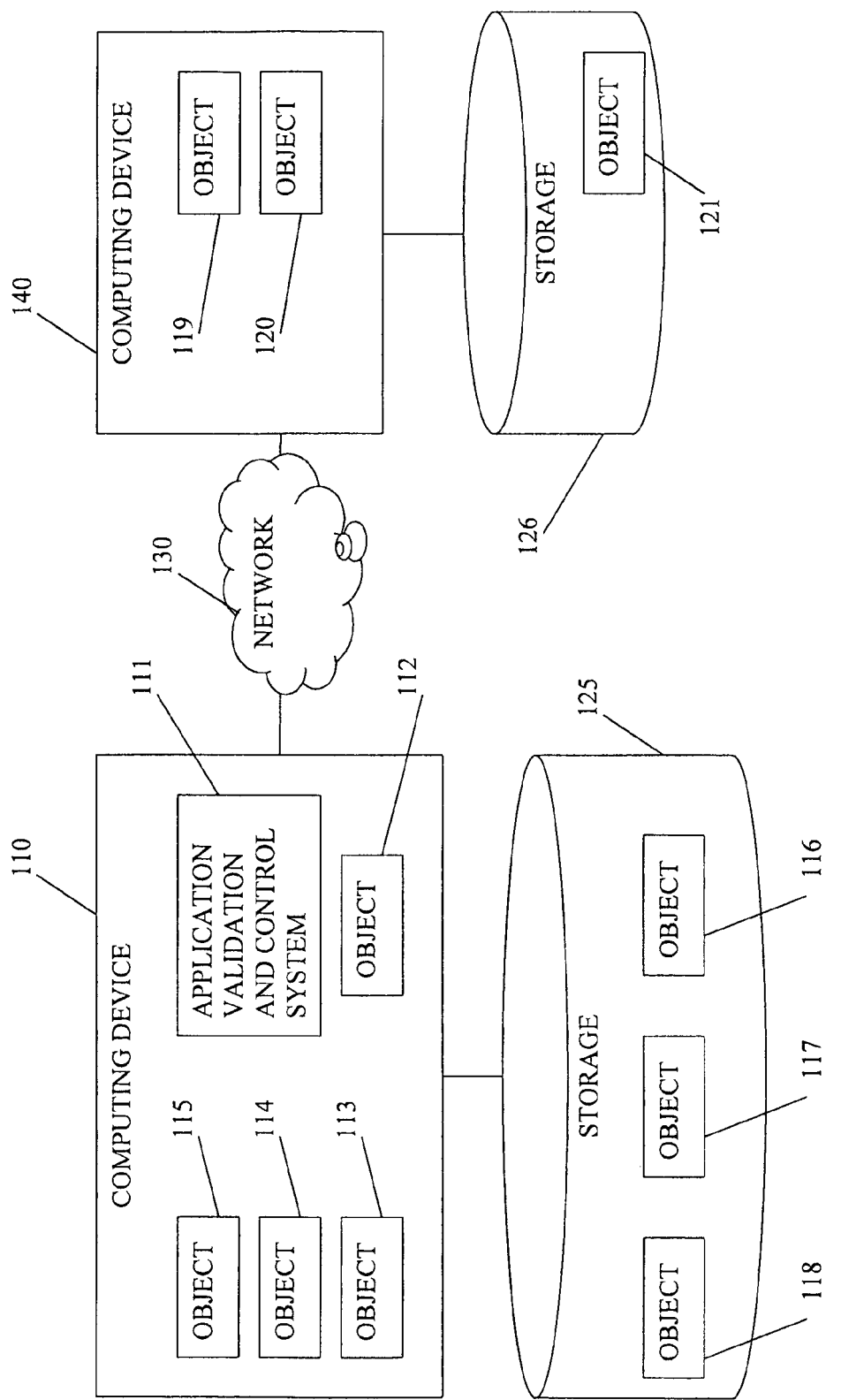
FIG. 1 is a schematic block diagram of a computing environment comprising an application control system according to embodiments of the invention.

Reference is now made to FIG. 1 showing a schematic block diagram of a computing environment comprising an application validation and control system according to embodiments of the invention. According to embodiments of the invention, such environment may comprise computing devices 110 and 140, associated storage facilities 125 and 126, network 130 and digital object 112-121. Computing devices 110 and 140 may be operatively connected to storage 125 and 126 respectively. Network 130 may enable computing devices 110 and 140 to communicate.

According to embodiments of the invention, computing devices 110 and 140 may include or may be, for example, a personal computer, a desktop computer, a mobile computer, a laptop computer, a notebook computer, a terminal, a workstation, a server computer, a Personal Digital Assistant (PDA) device, a tablet computer, a network device, a mobile phone, a household appliance or any other applicable computing device. According to embodiments of the invention, computing devices 110 and 140 may include components such as, but not limited to, a plurality of central processing units (CPU) or any other suitable multi-purpose or specific processors or controllers, a plurality of input units, a plurality of output units, a plurality of memory units, and a plurality of storage units. Computing devices 110 and 140 may additionally include other suitable hardware components and/or software components.

According to embodiments of the invention, network 130 may be, may comprise or may be part of a private IP network, the internet, an integrated services digital network (ISDN), frame relay connections, modem connected to a phone line a public switched telephone network (PSTN), a public or private data network, a local area network (LAN), a metropolitan area network (MAN), a wide area network (WAN), a wireline or wireless network, a local, regional, or global communication network, an enterprise intranet, any combination of the preceding and/or any other suitable communication means. It will be recognized that embodiments of the invention are not limited by the type, nature or other aspects of network 130.

According to embodiments of the invention, storage units 125 and 126 may include or may be, for example, a hard disk drive, a floppy disk drive, a Compact Disk (CD) drive, a CD-Recordable (CD-R) drive, or other suitable removable and/or fixed storage unit. Storage 125 and storage 126 may include or may be a USB storage device, a network storage device, a FLASH storage device or any applicable storage media, facility or sub-system. It will be recognized that embodiments of the invention are not limited by the type, nature or other aspects of storage modules 125 and 126.

According to embodiments of the invention, digital objects 112-121 may be any digital objects. For example, digital objects 112-121 may be executable code, e.g., an application, application extension, dynamic library, device or software driver or program executable code. Alternatively, digital objects 112-121 may be any digital information structures that may be validated or identified by embodiments of the invention. For example, some of digital objects 112-121 may be formatted or unformatted text documents, inventory or other lists, tables, or any digital information objects that may be used, stored, maintained or manipulated by a computing devices.

Figure 2:
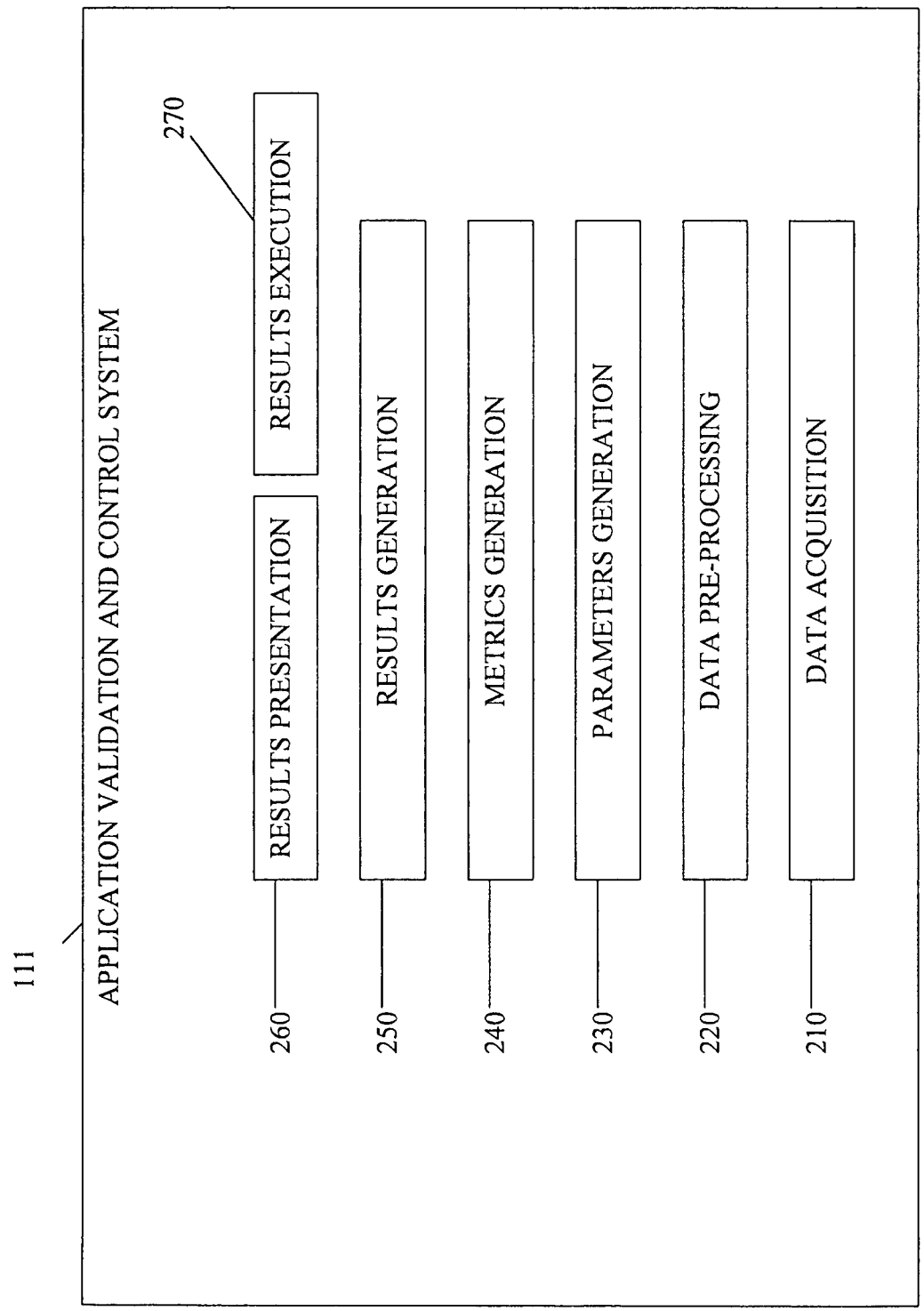
FIG. 2 is a schematic block diagram of an application control system according to embodiments of the invention.

Reference is now made to FIG. 2 showing a schematic block diagram of an application control system according to embodiments of the invention. According to embodiments of the invention, application control system 111 may be a software application executed on a computing device where the computing device may be a dedicated hardware device or it may be or may comprise hardware, firmware or a combination of hardware, software and firmware. According to embodiments of the invention, system 111 may corroborate, authenticate, confirm and/or certify attributes of, authorize use of or otherwise validate one or more objects such as digital objects 112-121. According to embodiments of the invention, system 111 may use reference or validated digital object to validate other digital objects. For example, digital object 112 may be assumed to be an authentic or validated object by system 111.

According to embodiments of the invention, system 111 may use pre-validated object 112 to validate, authenticate, verify or compute difference measures and/or indicators for, a number of objects associated with object 112. For example, object 112 may be an application such as a word editor or web browser and objects 113 and 114 may be instances of the same application. Alternatively, object 112 may be an application extension, a dynamic library or a device driver. According to embodiments of the invention, system 111 may use authenticated object 112 as reference in a process of validating objects 113 and 114.

According to some embodiments of the invention, an object validation process may comprise comparing an object to be validated with an object known to be valid. For example, object 112 may be known or assumed to be a valid and/or authenticated object and validating object 113 may comprise, for example, comparing object 112 with object 113 where if the two objects are found to be identical then object 113 may be considered valid. According to other embodiments of the invention, rather than using a valid or authenticated object, e.g., object 112 in the example above, various parameters related to a valid object may be extracted from the valid object or may be otherwise obtained. Such parameters may be used for validating other objects. For example, parameters may be extracted from object 112 or they may be calculated based on various attributes of object 112 and may be used to validate object 113 by obtaining similar parameters related to object 113 and computing difference metrics based on such parameters. For example, parameters such as the size of a text segment, code segment or specific internal tables of object 112 may be obtained, for example by extracting them from object 112. Such parameters may be stored by embodiments of the invention, for example, in volatile or nonvolatile memory, on a USB storage device or on a hard drive, and may be used when validating associated objects. For example, assuming object 114 may be validate using object 112, parameters such as the size of a text segment, code segment or specific internal tables may be obtained from object 114 and may further be related to the ones obtained from object 112. Such method may improve performance and/or reduce storage requirements by reducing the size of information that needs to be stored and manipulated.

According to embodiments of the invention, system 111 may obtain objects from any applicable or suitable location or storage. For example, objects 117 and 118 may be validated by system 111 using object 115 stored in memory of computing device 110 or objects 117 and 118 may be validated using object 116 stored on storage 125. Alternatively, system 111 may obtain objects from a remote storage or computing device. For example, system 111 may obtain object 120 or object 121 and use such obtained objects to validate local objects such as 116 or 113 or validate such obtained objects using a local object such as object 112 or 117. According to embodiments of the invention, objects used by system 111 may be stored on a storage device such as storage 125, loaded in memory such as objects 113 or 114 or stored on a remote computing device, e.g., objects 121 or 119. Accordingly, an application control system such as system 1111 may, according to embodiments of the invention, validate objects or application stored, loaded, executed or otherwise associated with a number of possibly distant computing devices, e.g., a set of computers in an organization or site.

According to embodiments of the invention, objects 112-121 may be complex objects, multipart objects, composite objects or a combination of objects or elements. For example, object 116 on storage device 125 may be a folder or directory, possibly containing hundreds of objects, e.g., files and/or subdirectories or folders. According to embodiments of the invention, possibly using respective composite or complex objects, such complex, multipart objects may be validated by system 111. Other examples of complex, amalgamated, composite or other objects that may be regarded as valid objects for validation and/or control, or other operations as described, may be a disk drive, a folder or directory, a storage device, an entire file system, partition or drive. According to embodiments of the invention, a validation process may be recursive. For example, system 111 may iterate over all objects or elements stored in a folder or drive in storage 125 and validate each of the objects stored therein. As will be described, a discrete measure of difference, metric and/or indicator may be computed for some or all elements contained in such composite objects and a composite metric, measure of difference and/or indicator may be computed based on some or all such discrete indicators, metrics, values and/or measures.

According to embodiments of the invention and as shown by block 210, system 111 may comprise a data acquisition module. Such module may assume the task of obtaining data and/or information required for performing application validation or other functions of system 111 discussed above. Although according to embodiments of the invention, other modules of system 111 may communicate or interact with entities external to system 111, module 210 may perform the task of retrieving data such as an application code, the content of a file or other object to be validated etc. For example, module 210 may read segments of code of an application from memory of computing device 110 and provide such code segments to higher layers of system 111. Alternatively, module 210 may read data from storage 125. For example, a reference object that may be pre-validated, authenticated or otherwise known to be suitable to be used as reference may be read by module 210 and provided to other modules of system 111. According to embodiments of the invention, module 210 may obtain data from remote computing devices. For example, an application loaded in memory of remote computing device 140 may be validated, identified, corroborated and/or authenticated by system 111 executing on local computing device 110. Accordingly, module 210 may read or otherwise obtain a copy of some or all segments of object 119 that may be an application, and provide such copy or segments to other modules comprising system 111, for example, data pre-processing module 220.

According to embodiments of the invention and as shown by block 220, system 111 may comprise a data or information pre-processing module. According to embodiments of the invention, module 210 may prepare input data for further processing by reformatting sections of input data, converting, altering or otherwise manipulating input data. Module 210 may omit some sections of data provided by module 210, add data or information to input from module 210 or perform or apply any manipulations in association with input received. According to embodiments of the invention, module 220 may disassemble input data, for example, binary code may be reverted to its assembly code or code may be otherwise transformed to an alternate, original or previous form. Such transformation may enable embodiments of the invention to logically analyze the code, for example, as is known in the art, assembly language code or text of a program or application may be analyzed to infer, understand, deduce or realize aspects such as control flow, routines and functions, logic used and/or implemented and the like.

According to embodiments of the invention, possibly subsequent to disassembling input data as described, module 210 may divide input to basic or functional blocks. Such functional blocks may correspond to a program's control flow as inferred from the disassembly. According to embodiments of the invention, module 210 may convert or transform input data to render it address independent. For example, module 210 may strip any address-specific information from the input data. As known in the art, stripping of address specific information may eliminate the effects of relocations of code segments and may accordingly enable comparing or otherwise relating specific parts of two or more code segments. As known in the art, such relating, e.g., code comparison, may be complicated if not impossible when the effect of addresses on the relevant codes are not avoided.

According to embodiments of the invention and as shown by block 230, system 111 may comprise a parameters generation module. According to embodiments of the invention, module 230 may derive, receive, compute, calculate, infer or otherwise obtain any applicable parameters that may be used to relate two or more segments of respective two or more input data objects. For example, such parameters may be associated with file or object properties as may be reflected by or obtained from, an operating system, e.g., file size, file or object modification time, type, format and the like. Other parameters that may be obtained by module 230 may be Portable Executable (PE) properties such as various time parameters, e.g., TimeDateStamp (compilation time), text segment size and characteristics, version information, various hashes of PE segment data, contents of the Imports Address Table (IAT) and Exports Address Table (EAT), StringTable program descriptions, vendor data, legal copyrights, version numbers etc. According to embodiments of the invention, module 230 may obtain or compute parameters and/or information such as Authenticode signatures that may provide a cryptographically certifiable proof of an executable's identity, cryptographic or other hash values that may have been computed and associated with an object, or any other relevant and/or applicable, possibly commercial or third party's information and/or parameters associated with the object in question.

According to embodiments of the invention and as shown by block 240, system 111 may comprise a metrics generation module. According to embodiments of the invention, information, values, parameters or data derived, received, computed, calculated, inferred or otherwise obtained by parameters generation module 230 may be used by metrics generation module 240. According to embodiments of the invention, module 240 may compute, calculate or otherwise derive metrics by relating one or more parameters or information items. For example, any parameters or values provided by module 230 may be compared or otherwise related in order to derive a metrics. For example, file size, file or object modification time, type and/or format may be compared and a corresponding metric indicating a level of equivalence may be computed according to such comparison's results.

According to embodiments of the invention, any parameters or information provided by module 230 as described above, e.g., TimeDateStamp, text segment size, version information, various hashes, IAT, EAT, Authenticode signatures, vendor data, copyrights information and/or version numbers may be used by module 240 to compute metrics. According to embodiments of the invention, metrics computed by module 240 may be based on information obtained from an operating system, e.g., file properties or attributes or properties of Windows™ Portable Executable format, or Linux or Unix Common Object File Format (COFF) information. According to embodiments of the invention, module 230 may be configured to extract specific sections from an input object. For example, specific text strings may be extracted in order to be compared with respective text strings of a pre-validated object. For example, text strings at specific offsets or addresses may be extracted from both a tested object and a reference, pre-validated object and may further be related or compared as will be described below.

According to embodiments of the invention, metrics computed by module 240 may be based on any applicable operations involving parameters provided by module 230 and/or any information that may be otherwise obtained. For example, comparing a size or modification time of an object or file may yield a metric of equivalence of two or more objects. According to embodiments of the invention, a metric may assume a range of values or it may assume discrete values. For example, when comparing or otherwise relating a set of attributes of two objects, a corresponding metric may assume a range of values according to the number of attributes found equal. Alternatively, weights may be assigned to such compared attributes and accordingly, the resulting metric value may reflect such weights. An example may be text comparison where by some text segments are found equal while other segments are different, in such case an associated metric may assume a specific value selected from a range of possible values reflecting various degrees of equivalence.

According to embodiments of the invention, a metric may be deterministic or boolean, e.g., assume values such as "TRUE" or "FALSE", or it may be of a statistical or otherwise non-definite nature, e.g., provide an estimated result. For example, a difference between compared objects that is an extra white space may cause a boolean metric to yield "FALSE", indicating that the compared objects are different. In contrast, since as known in the art, a white space may be insignificant in many cases, a more sophisticated metric may assume in such case a value indicating a minor, possibly insignificant difference.

According to embodiments of the invention, metric generation module 240 may be provided by module 230, or obtain by other means, parameters pertaining to a reference object. Such reference object may be pre-validated, authenticated, identified or otherwise a known and/or recognized object. For example, a user may provide system 111 with an authenticated or verified object to be used as a reference object or a, possibly secured and protected, folder may contain such reference objects and system 111 or module 230 may be configured to obtain reference objects from such folder. According to embodiments of the invention, module 240 may use parameters pertaining to a reference object and parameters pertaining to a tested object to compute metrics. For example, a comparison metric may compare parameters pertaining to a reference object with respective parameters of a tested object. For example, code comparison may be performed by comparing code segments of a tested object with respective code segments of a reference object. Such comparison may be performed after both the reference and tested objects have been disassembled, divided to functional blocks and stripped functional blocks generated by stripping of address related information as described above. Comparison may be performed by comparing stripped functional blocks.

According to embodiments of the invention, module 240 may be provided with such disassembled, stripped segments and may perform a comparison of such segments. According to embodiments of the invention, such comparison may be other than bit by bit or byte by byte comparison. According to embodiments of the invention, comparing code segments may comprise comparing abstract elements or other aspects, attributes, components, structures characteristics, properties, modules, sections, or any other applicable elements comprised in the compared objects. For example, a metric produced by comparing code segments may be a result of comparing a control flow of associated applications, an implementation of a specific algorithm by associated programs or specific routines and sub-routines.

According to embodiments of the invention, a Bloom filter may be utilized by module 240 to store metrics, for example, metrics associated with comparing or otherwise relating two or more objects. As known in the art, a Bloom filter may enable adding elements or objects to a group or set as well as performing membership-check, namely, checking if an object or element is a member of a given set, namely, has been previously added to the set or group. As also known in the art, a membership-check utilizing a Bloom filter may produce false positive results but not false negative results.

According to embodiments of the invention, a set of pre-validated objects as discussed above may be used. According to embodiments of the invention, such objects, parts or segments of such objects or any information, data or parameters associated with such pre-validated and/or verified objects may be stored utilizing a Bloom filter. For example, code segments of a number of verified, identified or otherwise validated different versions of the same, specific application may be added to a group using a Bloom filter. According to embodiments of the invention, a subsequent validation of a tested code segment may comprise performing a membership-check of the respective tested code segment. Accordingly, if the membership-check fails embodiments of the invention may assume the tested object is not a member of the group and accordingly may be an unknown object. As described above, a positive result provided by a Bloom filter may be inconclusive, but a negative one is. According to embodiments of the invention, a metric may reflect a result of a Bloom filter membership-check. According to embodiments of the invention, various sets or groups may be stored using a Bloom filter, a set may comprise the entire code of programs or application or it may comprise specific segments of such programs. Alternatively, a set may comprise parameters or information such as vendor data, copyrights information, version numbers or other version information, various hashes, IAT, EAT, Authenticode signatures or any applicable information or parameters. Such information may be added to any applicable number of separate sets or groups utilizing a Bloom filter and the resulting sets or groups may be used to perform membership-checks of tested objects as described above.

According to embodiments of the invention, modules 210-240 may act on or in association with composite objects as described above. For example, complex, amalgamated, composite or other objects that may be regarded as valid objects for validation, or other operations as described, may be a disk drive, a folder or directory, a storage device, an entire file system, partition or drive. According to embodiments of the invention, a set of metrics, indicators and/or difference measures may be computed for a number of elements comprising a complex object. For example, an authenticated folder, or data extracted from such folder on a disk drive may be used to verify or validate other folders. Such verification or validation may comprise iterating over all or over a preconfigured or otherwise selected subset of the information objects (e.g., files) contained in such folders. According to embodiments of the invention, a discrete difference measure, indicator and/or metric may be computed for each of the elements in the subset. A composite metric, indicator and/or difference measure may than be computed based on the previously computed discrete metrics, measures and/or indicators.

According to embodiments of the invention, the process of computing a composite measure, metric and/or indicator as described above may comprise averaging or weighted averaging the discrete metrics or any applying any applicable logic and/or heuristics such as omitting some of the discrete metrics or otherwise manipulating the discrete metrics, measures and/or indicators prior to combining them to a composite metric, measure and/or indicator. According to embodiments of the invention, combining said discrete metrics may comprise any applicable operations and or manipulations such as applying weights or taking interdependencies between discrete metrics into account.

According to embodiments of the invention and as shown by block 250, system 111 may comprise a results generation module. According to embodiments of the invention, results generation module 250 may be provided by module 240 with a set of metrics pertaining to a tested object and may compute validation results based on such provided metrics, for example, module 250 may compute a measure of difference relating two objects. For example, a measure of difference may be computed for a validated object and a tested object and may indicate the level, degree or amount of difference between the tested object and the validated or reference object. According to embodiments of the invention, module 250 may apply various algorithms, logic, heuristics or any applicable calculations and/or computations to a set of provided metrics in order to derive a result. According to embodiments of the invention, various weights may be attributed or associated with various metrics. For example, a metric indicating an incompatibility of version numbers may be considered as less severe, meaningful or compelling than a metric indicating incompatibility or inconsistency of main code segments. For example, according to embodiments of the invention, specific predefined code segments may be considered essential or critical and may accordingly be associated with a metric attributed a high level of importance or weight.

According to embodiments of the invention, module 250 may observe, employ and/or take into account metric interdependence considerations. For example, a metric reflecting date and time difference between two compared objects may be attributed a first weight, or level of effect on a computed result, if another metric indicates versions difference and a second weight, or level of effect on a computed result, if the metric associated with versions indicates that the object are associated with the same version. Such logic may assume that identical versions should be associated with the same time and date parameter while differing versions of the same program may legitimately be associated with different time and date parameters. According to embodiments of the invention, any applicable relations between metrics may be applied, considered or taken into account by module 250 in the process of computing a result.

According to embodiments of the invention, a result computed by module 250 may reflect a number of metrics. For example, a number of metrics computed by comparing or otherwise relating object properties such as file size, modification time, and cryptographic hash or metrics reflecting PE properties such as compilation time, Text Segment size and characteristics, Version Information; hashes of PE segment data, contents of the Imports Address Table and/or Exports Address Table, StringTable program descriptions, vendor data, legal copyrights, version numbers or metrics computed by relating Authenticode signatures and/or code comparisons as described may all be used for generating a result. For example, a result may simply comprise a list of computed metrics or a result may comprise a list of composite metrics computed by combining a number of metrics. For example, a composite metric may be computed by computing an average, a weighted average, a mean, a midrange, a median and/or a mode of a number of metrics.

According to embodiments of the invention, a result presented to a user may comprise computed metrics with their respective associated weights or a result may comprise one or more values and/or parameters reflecting a combined or composite metric. According to embodiments of the invention, a result may provide any applicable indication reflecting a level of closeness and/or a level of difference between a reference object and one or more tested objects. According to embodiments of the invention, a result may provide an indication of a level of validity of a tested object. Such level may range from a full, complete validation, namely, the tested object is certified to be authentic or the result may provide a variable level of confidence of authenticity.

According to embodiments of the invention, a result may be provided graphically. For example, a color bar provided may provide visual indication of a level of difference as described, e.g., a mark placed at a left green part of such bar may indicate a small difference while a mark placed at a right red area of such bar may indicate a significant difference between compared objects. Any combination of metrics, calculated results or other information and presentation methods such as bars, tables, graphs or other graphical objects may be used by embodiments of the invention to provide a user with results, indicators and/or metrics According to embodiments of the invention and as shown by block 260, embodiments of the invention may comprise a results presentation module. According to embodiments of the invention, results may be presented to a user by providing a textual, possibly non graphical, listing of computed metrics, composite metrics, indicators and/or results discussed above or a presentation of results may be provided by advanced GUI modules. Such GUI modules may provide graphical presentation of results discussed above in any applicable, graphical ways as known in the art.

Embodiments of the invention may be used or utilized in a variety of ways and for a number of purposes. For example, embodiments of the invention may be used in order to validate an application. Such application may be loaded in memory (e.g., executables that unpack themselves at load time), loaded in memory and executing, or it may be stored on a storage device. Another usage of embodiments may be a control of application. For example, possibly according to a level of validation, applications may be granted access rights to stored content, devices or any applicable computing resources. For example, an application that was determined to be authentic or otherwise recognized, verified or validated may be enabled to access a disk drive, specific information, e.g., registry keys, a specific folder or file or a device such as a network interface card (NIC) while an application that failed a validation process described above may be prohibited from accessing such resources. According to embodiments of the invention, programs, executables and/or application may be tested, checked, validated, authenticated and/or verified as described above and their permissions and/or access rights may be set according to the results of such validation or authentication.

According to embodiments of the invention, a user may configure embodiments of the invention by specifying rules associating levels of confidence with access levels. For example, a user may enforce rule whereby only applications or programs associated with a validation level of confidence above 85% (eighty five percent) may access a specific external storage device. Other examples may be black-listing and white-listing described above.

According to embodiments of the invention and as shown by block 270, system 111 may comprise a results execution module. According to embodiments of the invention, module 270 may comprise any logic, means and infrastructure required to execute actions and/or functions according to preconfigured rules and/or policies and according to results provided by module 250. For example, module 270 may be configured to interact with an operating system operating the relevant computing device and disable the operation of applications or programs for which the results of a validation process as described above are within a preconfigured range. For example, a rule may dictate that an application for which the measure of difference computed is above a predefined threshold is to be prohibited from executing. Such or different rule may further dictate that a program is also to be removed from memory and/or not permitted to be loaded into memory if a predefined metric is equal, above or below a predefined value. Other rules or policies according to which module 270 may operate may be associated with specific metrics, for example, a policy may dictate that programs or applications for which a metric associated with code comparison may not execute while another policy may dictate that information object for which a metric associated with modification time indicates a difference are not to be accessed.

According to embodiments of the invention, module 270 may control programs execution, for example, by interacting with an operating system or by any other applicable means. According to embodiments of the invention, such control may be enabling and/or disabling an execution of a program or application or it may be disabling a program from accessing various resources. For example, module 270 may prevent a program from accessing information on a storage device, e.g., specific files or folders or module 270 may prevent an application from accessing a device, for example, a network interface card, an input or output device such as speakers or display or any other computing or other resources.

It will be recognized that the above described application control system and modules are an exemplary design and/or implementation. Alterations and/or permutations such as modifications, additions, or omissions, may be made to system 111 without departing from the scope of the invention. For example, system 111 described above may have more, fewer, or other modules. For example, results presentation module 260 may be omitted or combined with module 250, or modules 250 and 240 may be combined into a single module, or an implementation may comprise a single program that may execute all functionalities described above. Additionally, operations of system 111 may be performed using any suitable logic comprising software, hardware, firmware or any combinations of the preceding.

Figure 3A:
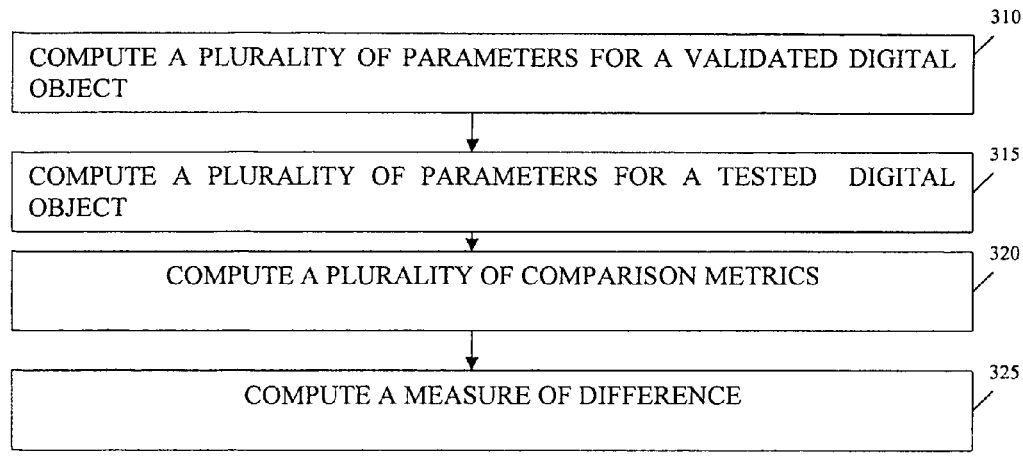
FIG. 3A depicts an exemplary flowchart for computing a measure of difference according to embodiments of the invention.

Reference is now made to FIG. 3A depicting an exemplary flowchart for computing a measure of difference according to embodiments of the invention. According to embodiments of the invention and as shown by blocks 310 and 315, the flow may include computing a plurality of parameters. Parameters may be computed for a reference or validated object (310) and for one or more tested objects (315). Parameters computed may be any parameters such as those computed or generated as described with reference to module 230 of system 111. As shown by block 320, the flow may include computing a plurality of comparison metrics, for example as computed by module 240 of system 111. According to embodiments of the invention and as shown by block 325, the flow may include computing a measure of difference, for example as described with reference to module 250 of system 111.

Figure 3B:
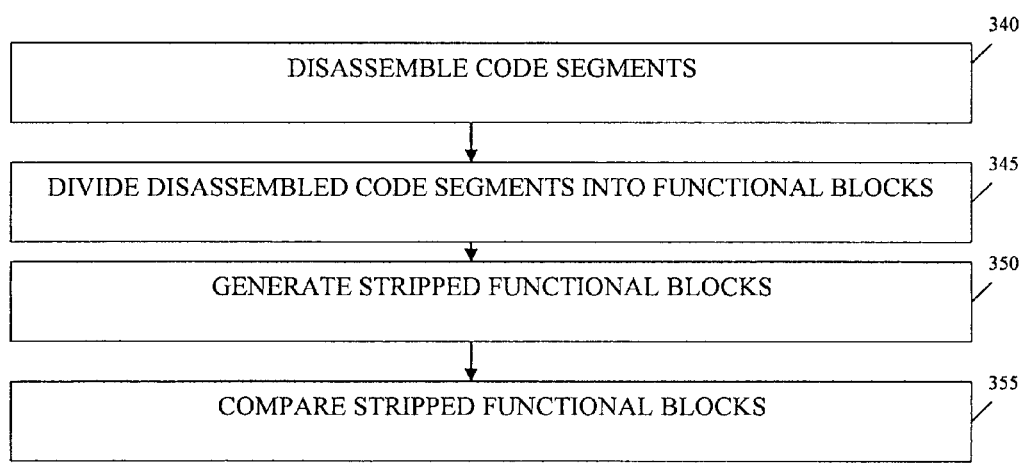
FIG. 3B depicts an exemplary flowchart for code comparison according to embodiments of the invention.

Reference is now made to FIG. 3B depicting an exemplary flowchart for performing a code comparison according to embodiments of the invention. According to embodiments of the invention and as shown by block 340, the flow may comprise disassembling code segments of a tested object and a reference object, for example as described with reference to module 220 of system 111. As shown by block 345, the flow may include dividing disassembled code segments into functional blocks as described with reference to module 210 of system 111. As shown by block 350 the flow may include generating stripped functional blocks as described with reference to module 210 of system 111. According to embodiments of the invention and as shown by block 355 the flow may comprise comparing stripped functional blocks, for example, as described with reference to module 240 of system 111.

While certain features of the invention have been illustrated and described herein, many modifications, substitutions, changes, and equivalents may occur to those skilled in the art. It is, therefore, to be understood that the appended claims are intended to cover all such modifications and changes as fall within the true spirit of the invention.

What is claimed is:

1. A method of validating and controlling applications comprising:
    computing a plurality of parameters for a validated digital object and for a tested digital object, wherein the tested digital object is an application being validated;
    computing a plurality of comparison metrics based on said parameters, wherein computing at least one of said metrics comprises performing a membership-check to determine if a parameter associated with said tested digital object is a member of a predefined group and wherein said membership-check comprises utilizing a Bloom filter;
    utilizing said plurality of comparison metrics to compute a measure of difference between said validated digital object and said tested digital object;
    providing an indication of a level of validity of the tested digital object based on the comparison metrics; and
    controlling an execution of said application according to the level of validity, wherein controlling comprises disabling an operation of the application if the level of validity is within a preconfigured range.

2. The method of claim 1, wherein said measure of difference is selected from the list consisting of: equality and difference.

3. The method of claim 1, wherein at least one of said metrics is a code comparison metric of executable code segments and wherein computing said code comparison metric comprises:
    disassembling a code segment;
    dividing said disassembled code segment into functional blocks corresponding to a control flow of said executable code; and
    comparing said functional blocks with respective functional blocks associated with said validated digital object.

4. The method of claim 3, comprising:
    generating stripped functional blocks by stripping address-specific data from said functional blocks; and comparing said stripped functional blocks with respective stripped functional blocks associated with said validated executable code segment.

5. The method of claim 1, further comprising using said plurality of parameters computed for a validated object to compute a plurality of difference measures between said validated object and a respective plurality of tested objects.

6. The method of claim 1, wherein said validated object and said tested object comprise a plurality of elements and wherein computing said measure of difference comprises:
   computing a plurality of difference measures pertaining to at least some of said elements; and
   computing a composite measure of difference based on said plurality of difference measures.

7. The method of claim 1, wherein said validated object and said tested object are stored in one of: a volatile memory, a nonvolatile memory and a storage device.

8. The method of claim 1, wherein said digital object is selected from the list consisting of: an application, an application extension, a dynamic library, a device driver and a folder.

9. The method of claim 1, wherein said measure of difference is a numeric value.

10. The method of claim 1, wherein said tested digital object is an application and wherein said controlling comprises controlling access rights of said application.

11. The method of claim 1, wherein said controlling comprises controlling execution rights of said application.

12. The method of claim 1, wherein said computed plurality of parameters for a validated digital object are stored in a storage device and wherein computing a plurality of comparison metrics comprises retrieving said parameters from said storage device.

13. The method of claim 10, wherein said storage device is one of: a volatile memory, a nonvolatile memory, a USB storage device and a hard drive.

* * * * *